July 16, 1968 R. P. POWERS 3,392,772
PNEUMATIC TIRE AND A REPLACEABLE UNIT THEREWITH
Filed June 6, 1966
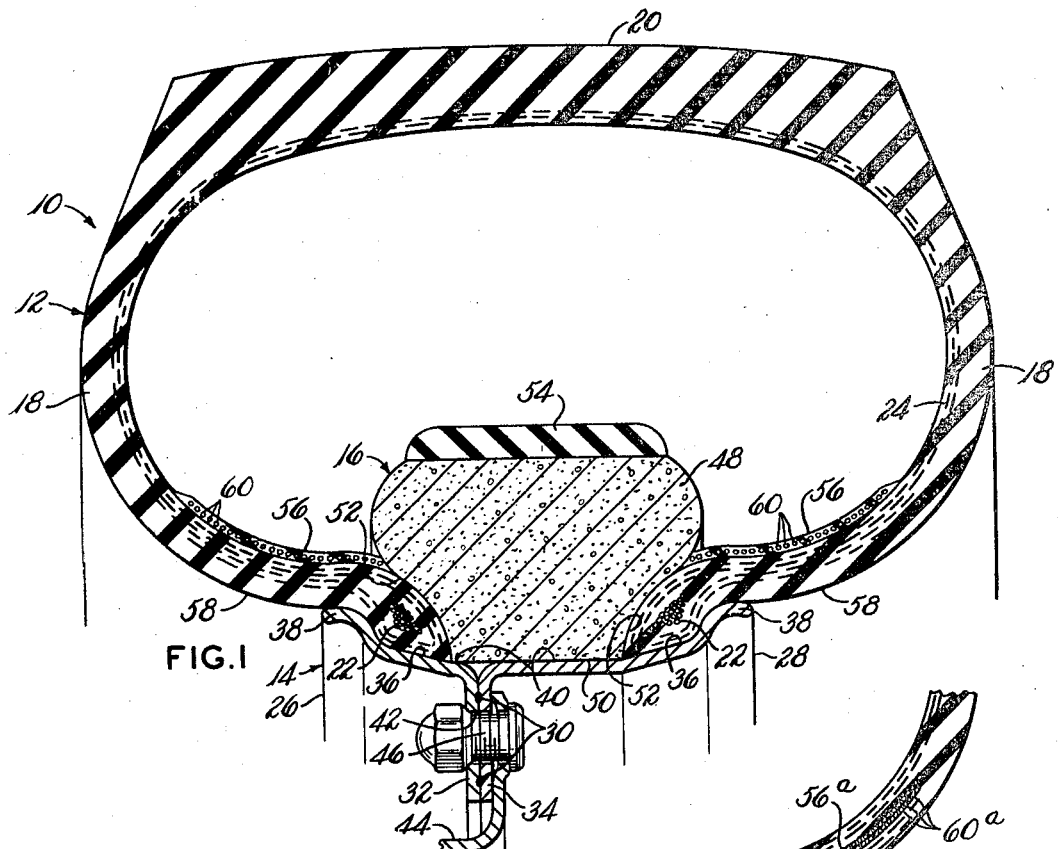
FIG. 1
FIG. 3
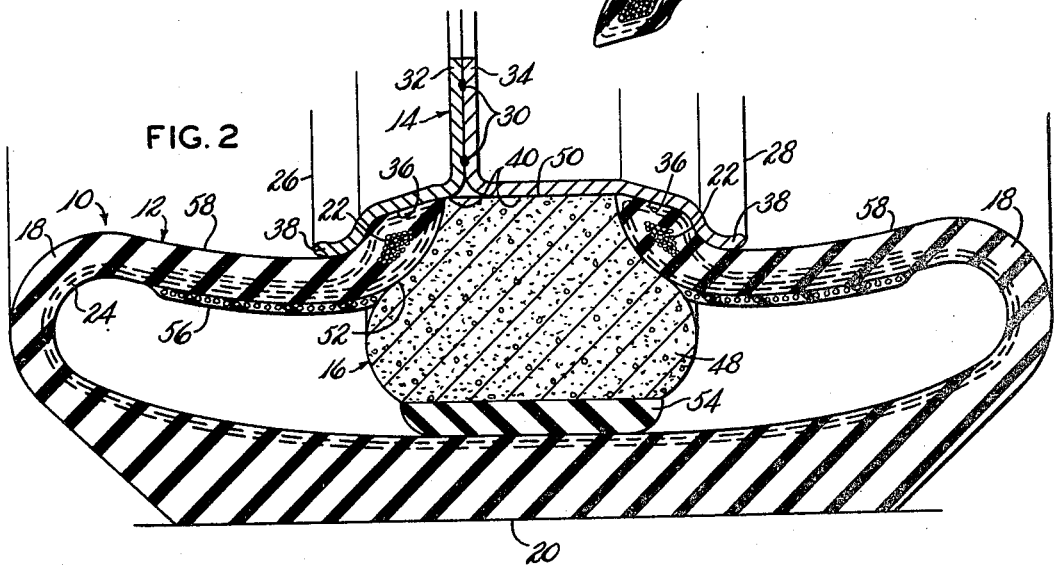
FIG. 2

United States Patent Office 3,392,772
Patented July 16, 1968

3,392,772
PNEUMATIC TIRE AND A REPLACEABLE
UNIT THEREWITH
Robert Pope Powers, Akron, Ohio, assignor to The Firestone Tire & Rubber Company, Akron, Ohio, a corporation of Ohio
Filed June 6, 1966, Ser. No. 555,340
22 Claims. (Cl. 152—158)

ABSTRACT OF THE DISCLOSURE

This disclosure relates to a pneumatic tire which is adapted to be mounted on a rim so that a substantial portion of its sidewalls extend from the rim flanges in a direction substantially parallel to the axis of rotation of the tire with these portions containing stabilizer members which extend from a point axially inwardly of the rim flange to a point axially outwardly of the rim flange and reinforce substantially all of the portions of the sidewall which are substantially parallel to the axis of rotation of the tire; this construction being well adapted to form a replaceable unit with a rim and an internal safety member. This unit is designed to eliminate the necessity of carrying a spare tire in a vehicle.

---

This invention relates to pneumatic tires and more particularly to a tire and rim assembly having a safety member incorporated therewith to eliminate the necessity of a spare tire.

Heretofore, many atempts have been made to provide a satisfactory tire having the necessary characteristics to provide safety, good performance and eliminate the need for a spare tire on a vehicle.

This invention fulfills the above requirements by providing a tire of unique construction combined with a lightweight, inexpensive rim, and a lightweight, one-piece annular safety member to form an integral assembly that is replaceable as a unit. Such unit could be pre-assembled by the manufacturer and would thus reduce the present laborious tire mounting procedures by the retailer or customer.

The invention provides a tire of larger than conventional bead diameter, wide section width and tread surface, low section height, beads that are substantially close together and stabilizing bands which give the tire lateral stiffness. Such a tire provides additional clearance for larger brake drums, improved riding qualities, greatly increased lateral stability or stiffness, and an unusual ability of running at high deflection, or even flat, without the customary folding and wrinkling.

The invention also provides a lightweight, inexpensive rim that is formed to be secured to a wheel disc.

The invention further contemplates a rigid, one-piece, lightweight, annualr, safety member to support the tire in event of tire failure adapted to seat on the rim and support the tire beads to hold them firmly in place on the rim.

It is therefore an object of this invention to provide an improved tire, rim and safety member unit.

Another object is to provide a tire having improved ride, traction and wear qualities.

Another object is to provide an improved lightweight, low cost tire-rim.

Another object is to provide an improved lightweight safety member.

Yet another object is to provide a pre-assembled tire, rim and safety member unit that will eliminate the need for a spare tire and wheel on a vehicle.

These and other objects will become more apparent after reference to the following specification and drawing, in which:

FIG. 1 is a sectional view of a tire, rim and safety member assembly in accordance with the invention;

FIG. 2 is a view similar to FIG. 1 showing the tire in flat or deflated condition;

FIG. 3 is a fragmentary sectional view showing a modification of the tire sidewall construction.

Referring to the drawing, a tire, rim and safety member unit is shown generally at 10 and comprises a tire 12, a rim 14 and a safety member 16.

The tire 12 is comprised of sidewalls 18, 18, tread portion 20, and annular beads 22, 22. Suitable body plies 24 are provided for the necessary reinforcement of the tire and consist of cords which may be of any suitable material and may extend in a radial direction or at a bias angle from bead to bead. As can be seen in the drawing the tire cross-section is extremely wide and low with the beads being close together, the reasons for which will be explained later.

The rim 14 is comprised of two section 26 and 28 suitably secured together as by welding at 30 on their radially inward extending flanges 32 and 34 to form an integral unit. Each rim section 26 and 28 is provided with bead seats 36, 36, terminating in flanges 38, 38 at their axially outer ends and in base portion 40 at their axially innermost portions. Holes 42 are provided in the flanges 32 and 34 to permit securing the rim 14 to a wheel disc 44 by bolts or studs 46. Alternatively the rim 14 may be welded to the disc 44.

Safety member 16 is formed of a one-piece, rigid, annular body portion 48 having a base portion 50 adapted to fit snugly on rim base portion 40 and undercut bead supporting and confining portions 52, 52 adapted to contact and support the tire beads in position on the rim 14. The safety member 16 is formed of a suitable lightweight material such as foamed or porous aluminum which has the necessary characteristics of being lightweight, but yet rigid and provides necessary strength. A tread portion 54 of material may be provided on the outer periphery of the member 16. The safety member 16 extends radially outward above the tire bead portions a substantial distance to provide support for the tire in the event of tire failure.

It is important that the tire section height be within the range of 30% to 70% of the tire section width and the rim have a width in the range of 30% to 70% of the tire section width.

Because of the profile of the tire 12 with the beads close together and the narrow rim, it is desirable to provide stabilizer members 56, 56 at the sidewall areas 58, 58 axially overhanging the rim flanges 38, 38 in cantilever fashion, to resist lateral distortion of the sidewalls.

The stabilizer members 56, 56 are in the form of bands on the interior of the tire sidewalls as shown in FIG. 1 or alternatively may be built internally in the sidewalls as shown at 56a in FIG. 3. Specifically, in FIGURES 1 and 2 the stabilizer members 56, 56 are located on the inner periphery of the sidewall portions or what is referred to in the art as the "band ply" of the tire. In either instance the stabilizer members are comprised of bands of rubbery material having a plurality of reinforcing cords 60, as shown in FIG. 1 and 60a as shown in FIG. 3, embedded therein extending in a rear circumferential direction to provide the necessary resistance to distorting influences. Suitable angles for the reinforcing cords are in the range of 50–75° to the axial center-line of the tire.

To assemble the unit 10, safety member 16 is first inserted into tire 12. Then tire 12 and saftey member 16 are telescopically slid on rim portion 28 until the bead 22 is seated on the bead seat 36. Then the rim portion 26 is placed into position and the flanges 32 and 34 of the rim portions 26 and 28 respectively are welded together as at 30. Holes 42 are pierced and chamfered, the tire inflated and the unit balanced to complete the assembly.

FIG. 2 illustrates the function of the safety member 16 and the configuration the tire 12 assumes upon deflation of the tire. The member 16 permits the vehicle to be kept under control and prevents the rim 14 from mutilating the tire upon deflation thereof. Also, due to the overhanging sidewall portions 58 and the narrow rim 14 the sidewalls are free to move radially inwardly without being pinched between the rim and the ground and ultimately damaged, thus permitting safe operation of the vehicle until repair or replacement can be made.

Therefore, the combination of the narrow rim 14, with the safety member 16, and the tire 12 having a low section height and larger than normal bead diameter, cooperate to form a unit of simple, inexpensive light weight construction, being easily assembled, and provides increased safety and improved riding and handling qualities.

From the foregoing it can be seen that the invention provides a novel preassembled tire and rim assembly having improved safety and performance qualities, reduced handling and storage problems and eliminates the necessity for a spare tire on a vehicle.

While one form of the invention has been shown and described, various modifications may occur to those skilled in the art without departing from the scope of the invention, as depicted in the following claims.

What is claimed is:

1. A pneumatic tire having a tread portion, sidewalls extending from the tread portion and terminating in annular beads, the tire adapted to be mounted on a rim having rim flanges and having a width in the range of 30% to 70% of the tire section width whereby a substantial portion of the sidewall of the tire adjacent said beads extends substantially axially outwardly in cantilever fashion from said rim flanges, the cantilever sidewall portions being reinforced by stabilizer members, said stabilizer members extending from a point axially inwardly of said rim flanges to a point axially outwardly of said rim flanges and comprising reinforcing cords extending at an angle in the range of 50° to 75° to the axial center line of the tire.

2. The tire of claim 1, wherein said stabilizer members are located on the inner periphery of the said cantilever sidewall portions.

3. The tire of claim 1, wherein said stabilizer members are located internally of said cantilever sidewall portions.

4. In combination, a pneumatic tire, a rim therefor and a safety member cooperating with said tire and rim, said rim comprising a base portion, opposed bead seats extending from said base portion terminating in flanges, said rim having a width in the range of 30% to 70% of the tire section width, said tire comprising a tread portion and sidewall portions terminating in bead portions seated on said bead seats, said tire having a section height in the range of 30% to 70% of the tire section width, said tire sidewall portions containing stabilizer members, said stabilizer members extending from a point axially inwardly of said rim flanges to a point axially outwardly of said rim flanges and comprising reinforcing cords extending at an angle in the range of 50° to 75° to the axial center line of the tire, and said safety member being seated on said rim and adapted to confine said bead portions between said rim and said safety member.

5. The combination of claim 4, wherein said safety member comprises rigid, lightweight material.

6. The combination of claim 4, wherein said safety member comprises porous aluminum.

7. The combination of claim 4, wherein said stabilizer members are located on the inner periphery of the sidewall portions.

8. The combination of claim 4, wherein said stabilizer members are located internally of said sidewalls.

9. The combination of claim 4, wherein said safety member is provided with an elastomeric tread portion.

10. In combination, a pneumatic tire, a rim and a safety member cooperating with said tire and rim, said rim comprising a base portion, opposed bead seats extending from said base portion and terminating in flanges, said rim having a width in the range of 30% to 70% of the tire section width, said tire comprising a tread portion and sidewall portions terminating in bead portions seated on said bead seats and having a tire section height in the range of 30% to 70% of the tire section width, said tire sidewall portions containing stabilizer members extending from a point axially inwardly of the rim flanges to a point axially outwardly of the rim flanges, and said safety member being seated on said rim and adapted to confine said bead portions between said rim and said safety member.

11. The combination of claim 10, wherein said safety member comprises rigid, lightweight material.

12. The combination of claim 10, wherein said safety member comprises porous aluminum.

13. The combination of claim 10, wherein said stabilizer members are located on the inner periphery of the sidewall portions.

14. The combination of claim 10, wherein said stabilizer members are located internally of said sidewalls.

15. The combination of claim 10, wherein said safety member is provided with an elastomeric tread portion.

16. A pneumatic tire having a tread portion, sidewalls extending from the tread portion and terminating in anular beads, the tire adapted to be mounted in a rim having rim flanges and having a width in the range of 30% to 70% of the tire section width whereby a substantial portion of the sidewalls of the tire adjacent said beads extends substantially axially outwardly in cantilever fashion from said rim flanges, the cantilever sidewall portions being reinforced by stabilizer members, said stabilizer members extending from a point axially inwardly of said rim flanges to a point axially outwardly of said rim flanges.

17. The tire of claim 16, wherein said stabilizer members are located on the inner periphery of the said cantilever sidewall portions.

18. The tire of claim 16, wherein said stabilizer members are located internally of said cantilever sidewall portions.

19. A pneumatic tire having a tread portion, sidewalls extending from the tread portion and terminating in annular beads, the tire adapted to be mounted on a rim having rim flanges and having a width substantially less than the tire section width whereby a substantial portion of the sidewalls of the tire adjacent said beads extends substantially axially outwardly in cantilever fashion from said rim flanges, the said cantilever sidewall portions being reinforced by stabilizer members, said stabilizer members extending from a point axially inwardly of said rim flanges, to a point axially outwardly of said rim flanges.

20. The tire of claim 19, wherein said stabilizer members are located on the inner periphery of the said cantilever sidewall portions.

21. The tire of claim 19, wherein said stabilizer members are located internally of said cantilever sidewall portions.

22. The tire of claim 19, wherein said stabilizer members reinforce substantially the entire cantilever portions of the sidewalls.

References Cited

UNITED STATES PATENTS

| | | | |
|---|---|---|---|
| 2,037,640 | 4/1936 | Macmillan | 152—352 |
| 2,308,959 | 1/1943 | Brink | 152—158 X |
| 2,986,189 | 5/1961 | Lindley | 152—158 |
| 2,989,108 | 6/1961 | Gore | 152—158 |

ARTHUR L. LA POINT, *Primary Examiner.*

Y. P. SCHAEVITZ, *Assistant Examiner.*

UNITED STATES PATENT OFFICE
CERTIFICATE OF CORRECTION

Patent No. 3,392,772                                                 July 16, 1968

Robert Pope Powers

It is certified that error appears in the above identified patent and that said Letters Patent are hereby corrected as shown below:

Column 1, line 55, "annualr" should read -- annular --. Column 3, line 8, "saftey" should read -- safety --. Column 4, line 25, after "members" insert -- , said stabilizer members --. Column 4, line 43, "anular" and "in" should read -- annular -- and -- on --.

Signed and sealed this 2nd day of December 1969.

(SEAL)
Attest:

Edward M. Fletcher, Jr.                                  WILLIAM E. SCHUYLER, JR.
Attesting Officer                                                Commissioner of Patents